US006343822B1

(12) United States Patent
Badura

(10) Patent No.: US 6,343,822 B1
(45) Date of Patent: Feb. 5, 2002

(54) PIVOTING SHOVEL HANDLE

(76) Inventor: Michael Walter Badura, 7072 Sunshine Ave., Las Vegas, NV (US) 89118

( * ) Notice: Subject to any disclaimer, the term of this patent is extended or adjusted under 35 U.S.C. 154(b) by 0 days.

(21) Appl. No.: 09/657,564

(22) Filed: Sep. 8, 2000

Related U.S. Application Data

(60) Provisional application No. 60/152,971, filed on Sep. 9, 1999.

(51) Int. Cl.[7] ................................................. A01B 1/22
(52) U.S. Cl. ........................................... 294/58; 16/426
(58) Field of Search ............................. 294/57, 58, 59, 294/54.5; 15/143.1, 144.1, 144.4, 145; 16/110.1, 422, 426, 429, 436, 438; 56/400.01; 172/371

(56) References Cited

U.S. PATENT DOCUMENTS

| | | | | |
|---|---|---|---|---|
| 1,827,118 A | * | 10/1931 | Stephens | 294/57 |
| 2,536,607 A | * | 1/1951 | Jenkins | 16/426 X |
| 2,547,451 A | * | 4/1951 | Eber | 294/58 X |
| 3,466,078 A | | 9/1969 | Sholund | |
| 4,690,447 A | * | 9/1987 | Adams | 294/58 X |
| 4,944,541 A | | 7/1990 | Waldschmidt | |
| 5,054,830 A | * | 10/1991 | Nisenbaum | 294/58 |
| 5,133,582 A | | 7/1992 | Rocha | |
| 5,411,305 A | | 5/1995 | Revoldt | |
| 5,431,468 A | | 7/1995 | Rosenshine | |
| 5,669,650 A | | 9/1997 | Rutz | |
| 5,788,299 A | | 8/1998 | Wilkinson | |
| 5,921,600 A | * | 7/1999 | Lucas | 294/58 |
| 5,984,393 A | * | 11/1999 | Washington | 294/57 X |

FOREIGN PATENT DOCUMENTS

| | | | | |
|---|---|---|---|---|
| BE | 531941 | * | 1/1958 | 294/58 |
| FR | 1109731 | * | 2/1956 | 294/58 |
| GB | 584189 | * | 1/1947 | 294/58 |
| WO | 91/17647 | * | 11/1991 | 294/58 |

* cited by examiner

*Primary Examiner*—Johnny D. Cherry
(74) *Attorney, Agent, or Firm*—Stephen Christopher Swift; Swift Law Office

(57) ABSTRACT

A pivoting auxiliary handle for a shovel or other hand tool having an elongated primary handle. The range of motion of the auxiliary handle about the axis of the elongated primary handle is limited. A user holds the primary handle in one hand and the auxiliary handle in the other hand. This reduces back strain, makes it easier to pick up, carry, and dispose of heavy loads, and allows the exertion of downward force by both hands (and also possibly a foot) on the tool. In the preferred embodiment, the elongated primary handle is generally cylindrical, and the auxiliary handle is attached to a circular collar that is seated within a recess in the shaft of the primary handle. The means for limiting the movement of the auxiliary handle is a pin extending outwardly from the recess in the shaft through a recess in the collar. The opposite ends of the recess in the collar limit the movement of the pin, and thereby limit the movement of the auxiliary handle. Preferably, the center of the recess is opposite to the point at which the handle is joined to the collar. Preferably, the arc of the recess around the axis of the primary handle is between 120 and 180 degrees, thereby limiting the movement of the auxiliary handle to between 120 and 180 degrees. Although primarily designed for shovels, the invention may also be applied to hoes, rakes, brooms, or other hand tools having an elongated handle.

18 Claims, 6 Drawing Sheets

PIVOTING SHOVEL HANDLE

CROSS REFERENCE TO RELATED APPLICATION

This application is based on Provisional Patent Application Ser. No. 60/152,971, filed Sep. 9, 1999.

BACKGROUND OF THE INVENTION

1. Field of the Invention

The present invention relates to auxiliary handles that pivot on elongated handles of shovels or other tools.

2. Description of the Prior Art

While there have been previous inventions for auxiliary handles on shovels or other tools with elongated handles, the present invention is distinguishable from any prior invention.

U.S. Pat. No. 3,466,078, issued on Sep. 9, 1969, to Richard J. Sholund, discloses the use of an auxiliary handle for a shovel. The handle is not able to pivot vertically or horizontally, but is vertically adjustable.

U.S. Pat. No. 4,944,541, issued on Jul. 31, 1990, to Kenneth P. Waldschmidt, discloses the use of a vertically adjustable two-handled shovel with an ability to pivot vertically.

U.S. Pat. No. 5,133,582, issued on Jul. 28, 1992, to Louis F. Rocha, discloses the use of a two-handled shovel, wherein in the preferred embodiment the secondary handle is able to pivot in complete circles around the shaft of the primary handle, which remains fixed, and is also able to pivot outwardly with the aid of a bushing. The present invention is distinguishable, in that it has a means for limiting the movement of the secondary handle, which is not disclosed in Rocha.

U.S. Pat. No. 5,411,305, issued on May 2, 1995, to Paul L. Revoldt, discloses the use of a removable and adjustable handle for a snow shovel.

U.S. Pat. No. 5,431,468, issued on Jul. 11, 1995, to Howard Rosenshine, discloses the use of an auxiliary handle for a snow shovel that pivots vertically through the use of a spring.

U.S. Pat. No. 5,669,650, issued on Sep. 23, 1997, to Almer J. Rutz, discloses the use of an attachable and adjustable auxiliary handle for a long-handled material-moving tool. The auxiliary handle does not pivot but is vertically adjustable.

U.S. Pat. No. 5,788,299, issued on Aug. 4, 1998, to James J. Wilkinson, discloses the use of a lever on an elongated shaft to convert a hand tool from a rake to a shovel and vice versa.

None of the above inventions and patents, taken either singly or in combination, is seen to describe the instant invention as claimed.

SUMMARY OF THE INVENTION

The present invention is a pivoting auxiliary handle for a shovel or other hand tool having an elongated primary handle. The range of motion of the auxiliary handle about the axis of the elongated primary handle is limited. A user holds the primary handle in one hand and the auxiliary handle in the other hand. This reduces back strain, makes it easier to pick up, carry, and dispose of heavy loads, and allows the exertion of downward force by both hands (and also possibly a foot) on the tool.

Accordingly, it is a principal object of the invention to reduce back strain while shoveling.

It is another object of the invention to make it easier to pick up, carry, and dispose of heavy loads while shoveling.

It is a further object of the invention to enable the exertion of extra downward force when digging with a shovel.

Still another object of the invention is to provide an auxiliary handle for hoes, rake, brooms, or other tools with elongated handles.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a pivoting auxiliary handle for a shovel or other hand tool having an elongated handle, such as a hoe, rake, or broom.

Figure 1:
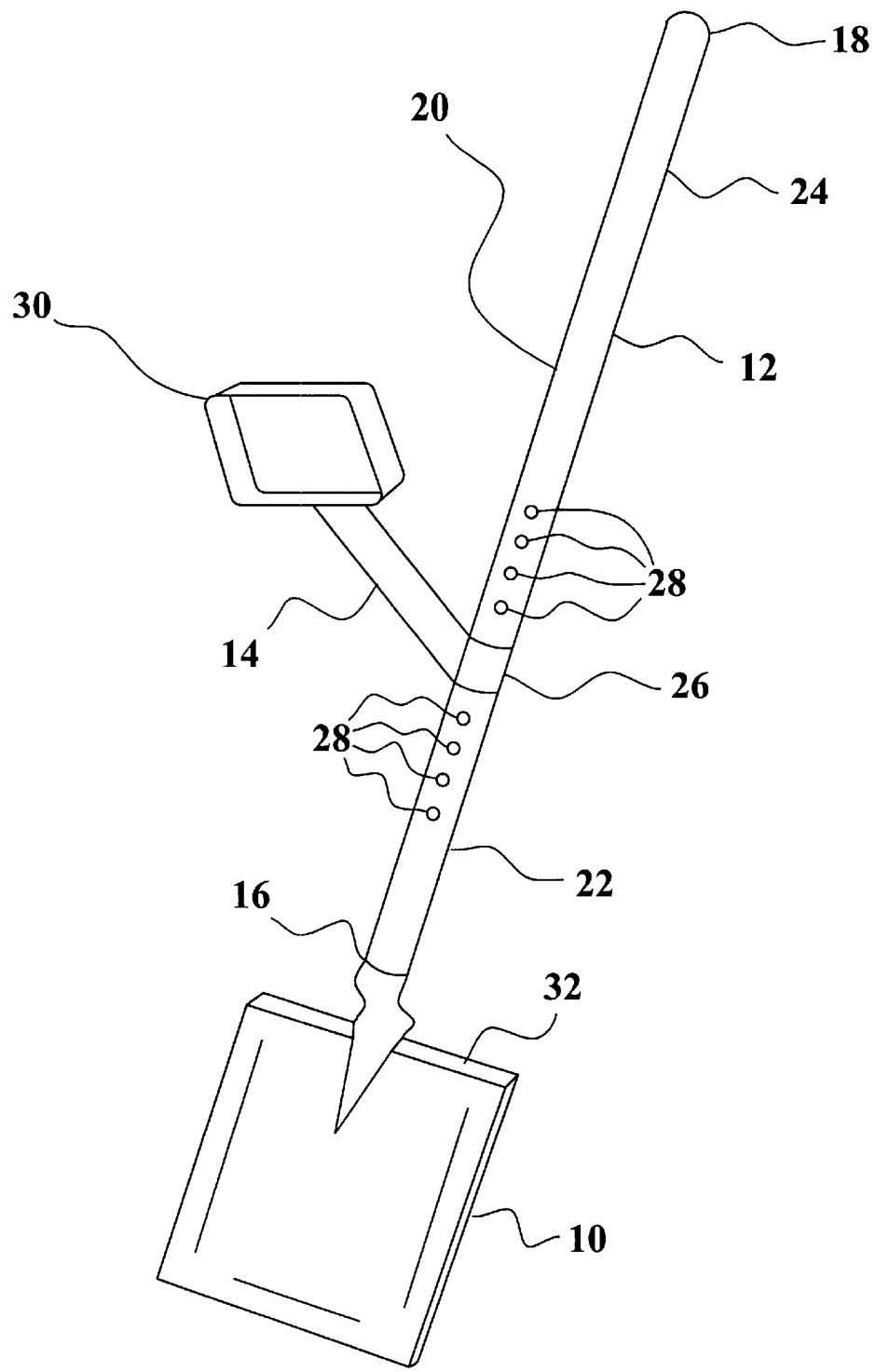
FIG. 1 is a perspective view of the preferred embodiment of the invention.

FIG. 1 is a perspective view of the preferred embodiment of the invention, showing the shovel 10 (for which another tool such as a hoe, rake or broom may be substituted), the elongated handle 12, and the auxiliary handle 14. The elongated handle has a first end 16 at which it is attached to the shovel, a second end 18 with no attachment, and a shaft 20 between the first end and the second end. The shaft comprises a first piece 22 and a second piece 24, between which is a collar 26 to which the auxiliary handle is attached. Rivets 28 pass through the first and second pieces. The auxiliary handle preferably has a loop 30 by which it may be more easily grasped and held. The shovel preferably has a flat top edge 32, on which a user may place the sole of his or her shoe or boot to exert more downward force when digging.

Figure 2:
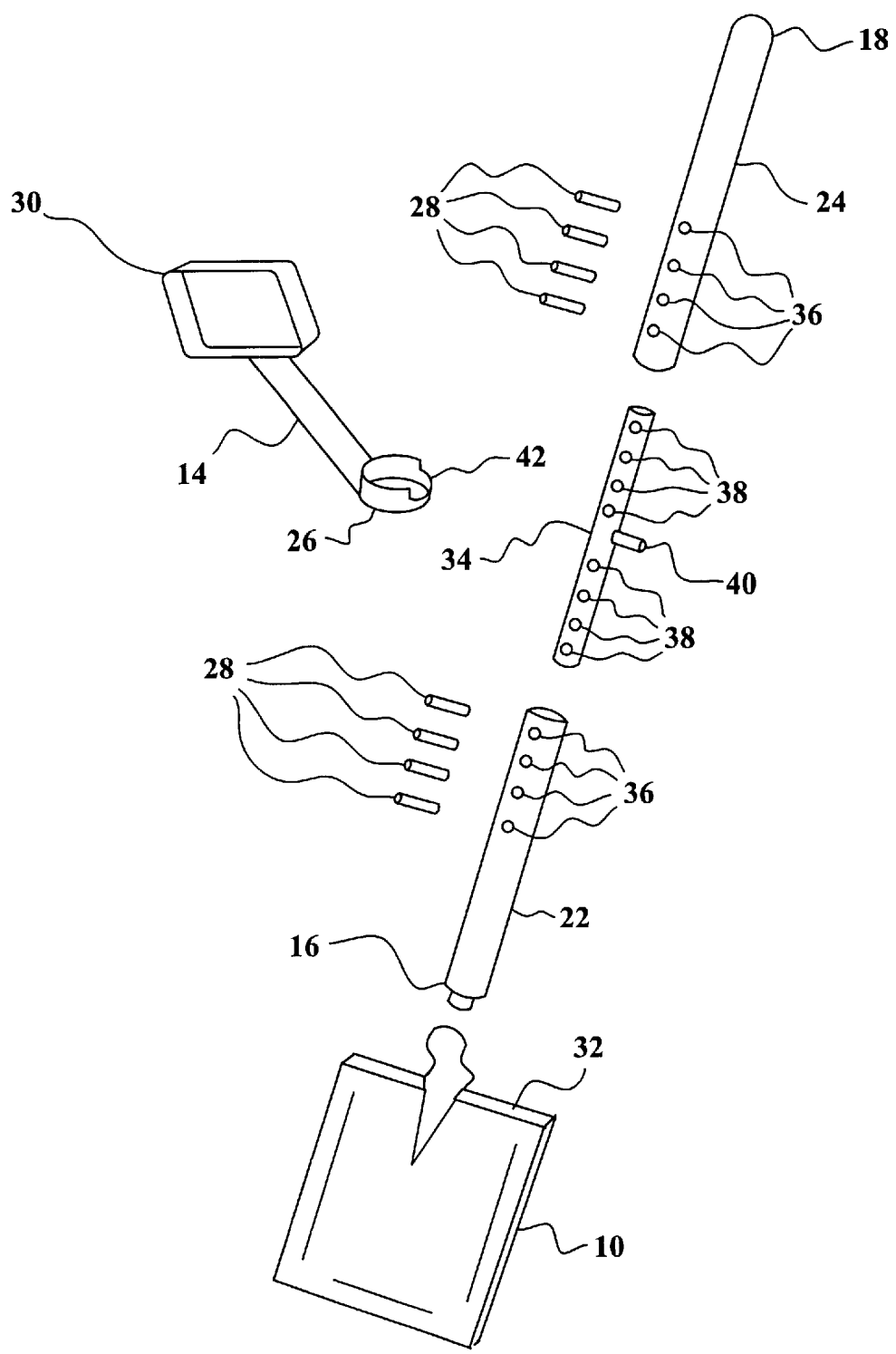
FIG. 2 is an exploded view of the preferred embodiment of the invention.

FIG. 2 is an exploded view of the preferred embodiment of the invention, showing the third piece 34 of the elongated handle, that fits within hollow spaces in the first and second pieces. The rivets 28 fit through transverse holes 36 in the first and second pieces of the elongated handle and matching transverse holes 38 in the third piece, to retain the first and second pieces on the third piece. (The rivets are optional. The pieces may be held together with epoxy or other glue, with or without the rivets.) Preferably, the first and second pieces are made of fiberglass (or wood), and the third piece of metal pipe. Alternatively, the elongated handle may be formed in one piece of any suitable material, with a recessed area into which may be fitted the collar 26 to which the auxiliary handle 14 is attached. A pin 40 extends outwardly from the third piece through a recessed portion 42 of the collar, limiting the movement of the collar.

Figure 3:
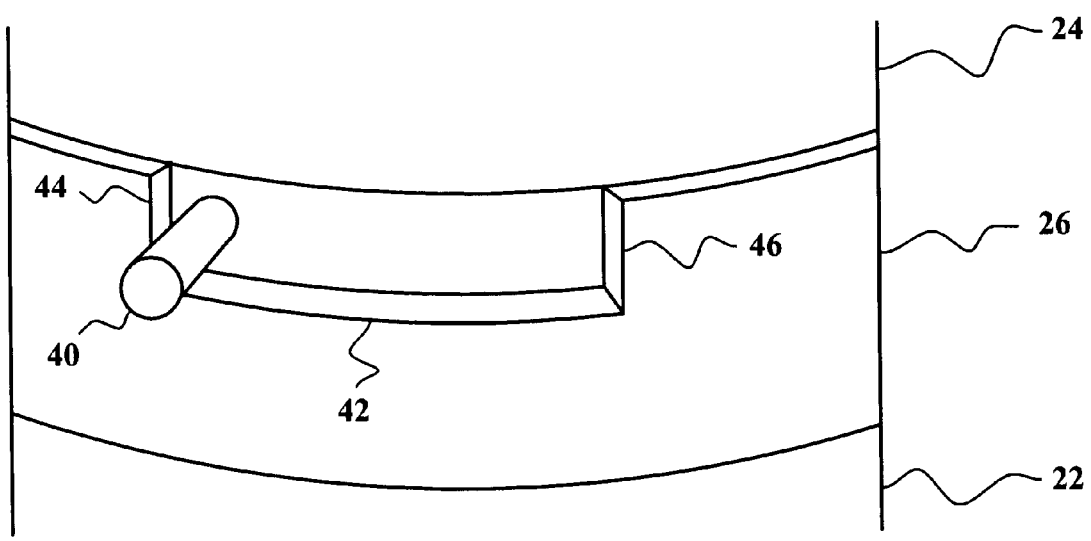
FIG. 3 is a detail view of the part of the preferred embodiment of the invention that limits the movement of the auxiliary handle.

FIG. 3 is a detail view of the part of the preferred embodiment of the invention that limits the movement of the auxiliary handle, showing the collar 26 between the first piece 22 and the second piece 24 of the elongated handle. The movement of the collar, and thereby the movement of the auxiliary handle attached to the collar, is limited by the pin 40 which passes through the recessed portion 42 with a first end 44 and a second end 46. The collar can only move between the angle at which the first end of the recessed portion contacts the pin and the angle at which the second end of the recessed portion contacts the pin. Preferably, the movement of the auxiliary handle is thereby limited to a range of not more than 180 degrees nor less than 120 degrees around the axis of the elongated handle. Ideally, the auxiliary handle can move over a range of 150 degrees. Limiting the movement of the auxiliary handle has the advantage of keeping it out of the way of the legs of the user when it is not grasped. But a sufficient range of movement should be allowed that material retained in the shovel can be unloaded by rotating the elongated handle, while holding the auxiliary handle in a fixed position.

Figure 4:
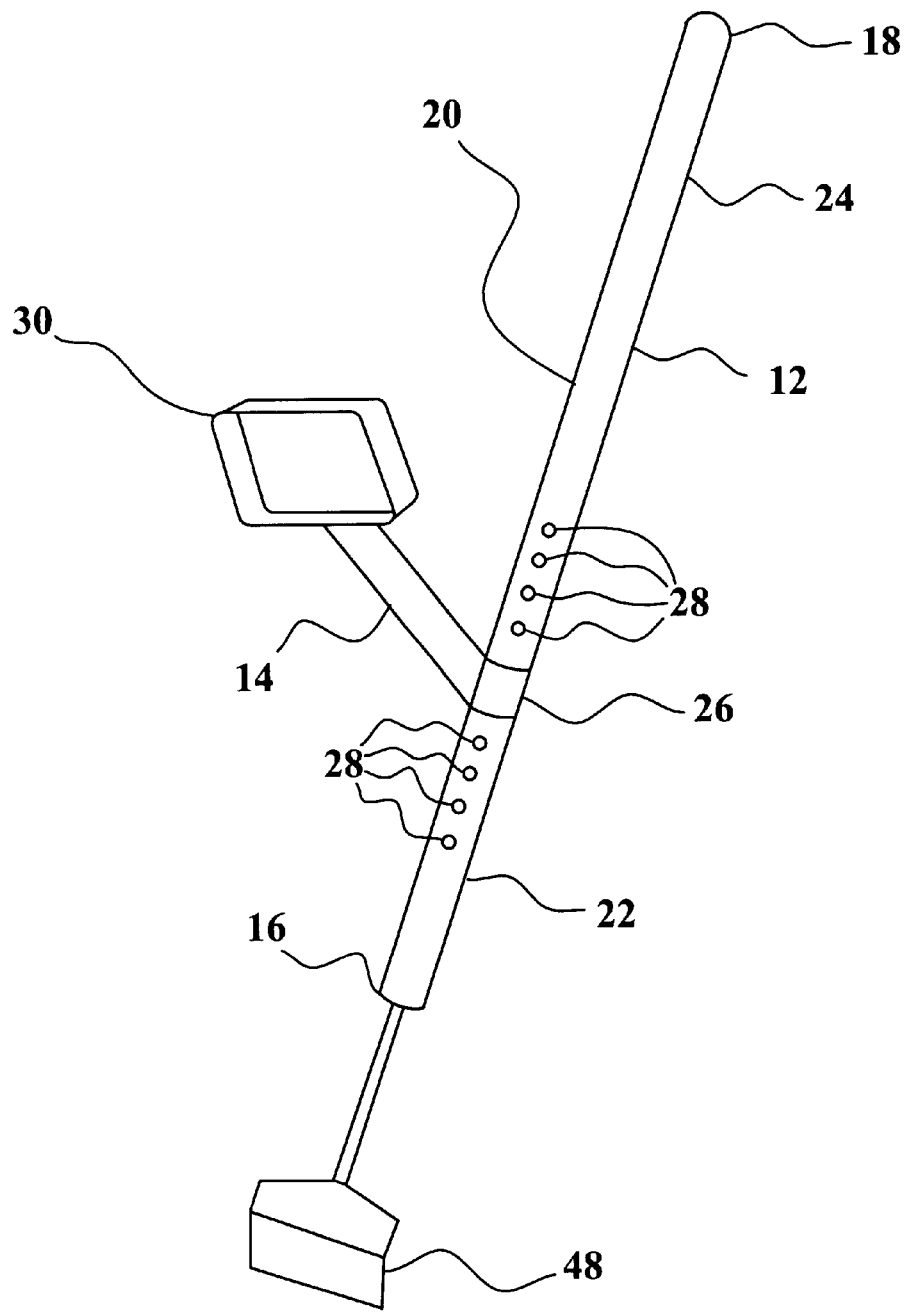
FIG. 4 is a perspective view of a first alternative embodiment of the invention.

FIG. 4 is a perspective view of a first alternative embodiment of the invention, which is the same as the preferred embodiment, except that a hoe 48 is substituted for the shovel.

Figure 5:
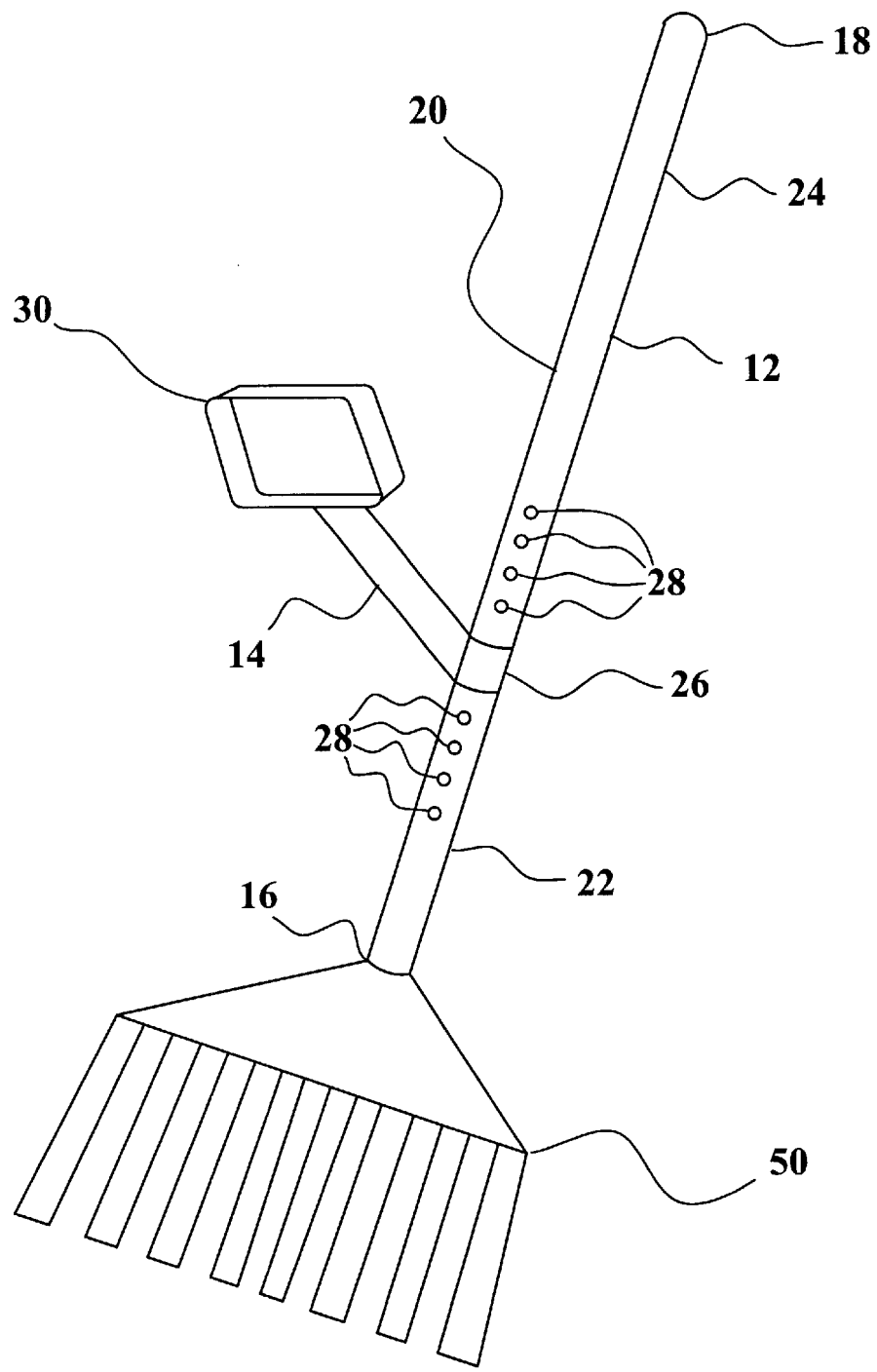
FIG. 5 is a perspective view of a second alternative embodiment of the invention.

FIG. 5 is a perspective view of a second alternative embodiment of the invention, which is the same as the preferred embodiment, except that a rake 50 is substituted for the shovel.

Figure 6:
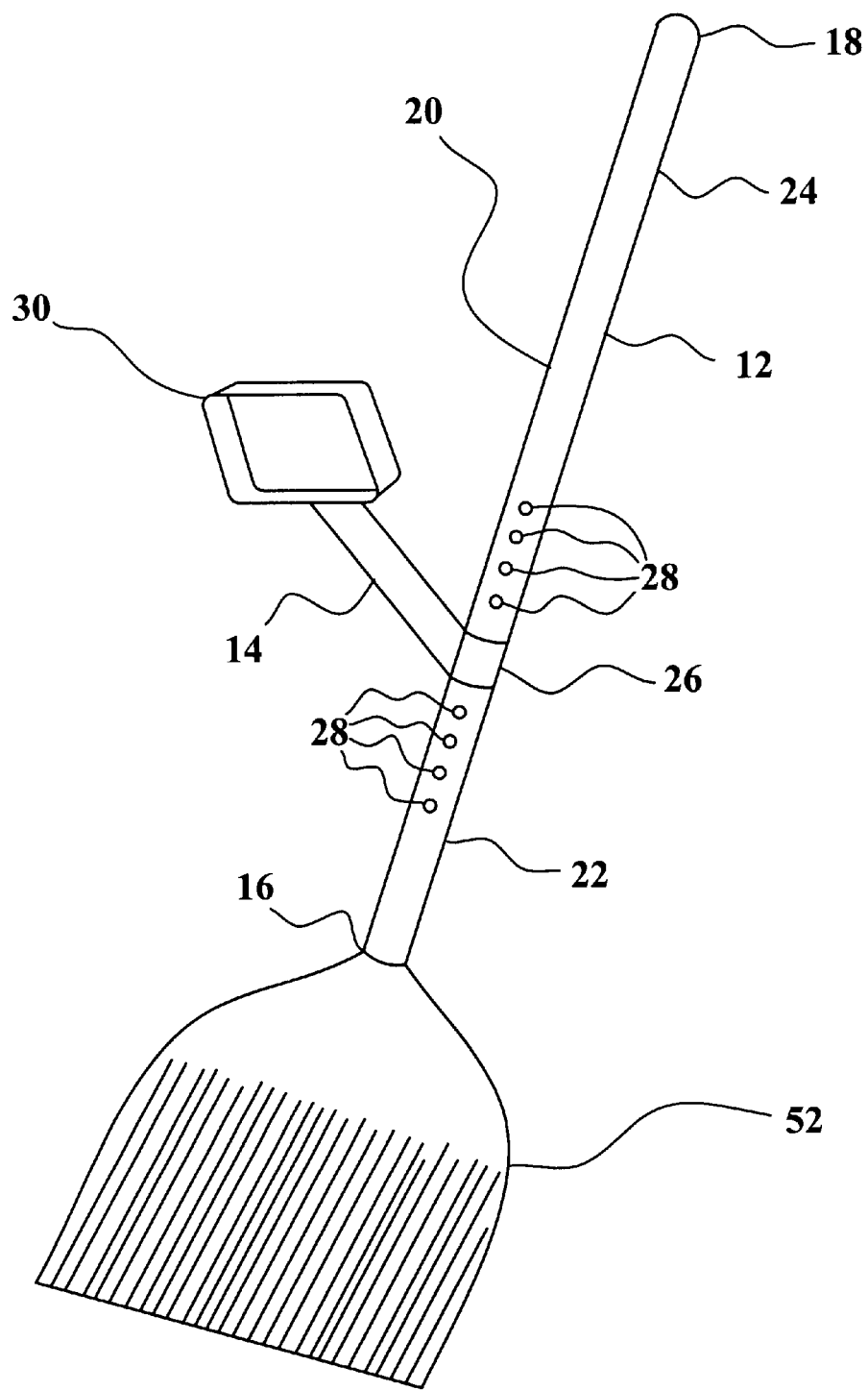
FIG. 6 is a perspective view of a third alternative embodiment of the invention.

FIG. 6 is a perspective view of a third alternative embodiment of the invention, which is the same as the preferred embodiment, except that a broom 52 is substituted for the shovel.

It is to be understood that the present invention is not limited to the sole embodiment described above, but encompasses any and all embodiments within the scope of the following claims.

I claim:

1. A hand tool with a pivoting handle, comprising:
    an elongated handle having a first end, a second end, and a shaft between the first end and the second end;
    a tool attached to the first end of the elongated handle;
    an auxiliary handle able to pivot about the shaft within a limited range of motion;
    a collar, to which the auxiliary handle is attached, that fits around the shaft of the elongated handle;
    a recessed portion in the collar, with a first end and a second end, and
    a pin that extends outward from the shaft into the recessed portion, limiting the movement of the collar and the handle attached to the collar to a range between the first end and the second end of the recessed portion.

2. The hand tool with a pivoting handle according to claim 1, wherein:
    the auxiliary handle is attached to the collar at a side of the collar opposite to the recessed portion of the collar.

3. The hand tool with a pivoting handle according to claim 2, wherein:
    the collar fits within a recessed portion of the shaft.

4. The hand tool with a pivoting handle according to claim 3, wherein the tool that is attached to the first end of the elongated handle is a shovel.

5. The hand tool with a pivoting handle according to claim 4, wherein:
    the shaft comprises a first piece extending from the first end of the elongated handle, a second piece extending from the second end of the elongated handle, and a third piece having a first end that fits within a hollow space in the first piece and a second end that fits within a hollow space in the second piece, with the recessed portion of the shaft formed by a gap between the first piece and the second piece.

6. The hand tool with a pivoting handle according to claim 5, wherein:
    the pin is attached to the third piece of the shaft.

7. The hand tool with a pivoting handle according to claim 6, wherein:
    the first and second pieces of the shaft are made of fiberglass, and the third piece is made of metal.

8. The hand tool with a pivoting handle according to claim 7, wherein:
    the first, second and third pieces of the shaft are generally cylindrical.

9. The hand tool with a pivoting handle according to claim 8, wherein:
    the third piece of the shaft is a pipe.

10. The hand tool with a pivoting handle according to claim 9, wherein:
    there are transverse holes through the first, second and third pieces of the shaft, and rivets that pass through the holes to retain the first and second pieces on the third piece.

11. The hand tool with a pivoting handle according to claim 10, wherein:
    the range of motion of the auxiliary handle about the axis of the elongated handle is not more than 180 degrees.

12. The hand tool with a pivoting handle according to claim 11, wherein:
    the range of motion of the auxiliary handle about the axis of the elongated handle is not less than 120 degrees.

13. The hand tool with a pivoting handle according to claim 12, wherein the shovel has a flat edge adjacent to the first end of the elongated handle.

14. The hand tool with a pivoting handle according to claim 13, wherein the auxiliary handle has a loop by which it may be grasped.

15. The hand tool with a pivoting handle according to claim 14, wherein there is no attachment to the second end of the elongated handle.

16. The hand tool with a pivoting handle according to claim 3, wherein the tool that is attached to the first end of the elongated handle is a hoe.

17. The hand tool with a pivoting handle according to claim 3, wherein the tool that is attached to the first end of the elongated handle is a rake.

18. The hand tool with a pivoting handle according to claim 3, wherein the tool that is attached to the first end of the elongated handle is a broom.

* * * * *